US012378781B2

(12) United States Patent
Wagman, III et al.

(10) Patent No.: US 12,378,781 B2
(45) Date of Patent: *Aug. 5, 2025

(54) MOUNTING ADAPTER FOR CONCRETE SURFACE PROCESSING TOOLS

(71) Applicant: Wagman Metal Products Inc., York, PA (US)

(72) Inventors: George F. Wagman, III, York, PA (US); Gary G. Hostetter, Jr., New Freedom, PA (US)

(73) Assignee: WAGMAN METAL PRODUCTS, INC., York, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/366,949

(22) Filed: Aug. 8, 2023

(65) Prior Publication Data

US 2023/0383551 A1 Nov. 30, 2023

Related U.S. Application Data

(60) Continuation of application No. 18/057,087, filed on Nov. 18, 2022, now Pat. No. 11,851,894, which is a division of application No. 16/842,994, filed on Apr. 8, 2020, now Pat. No. 11,643,825.

(51) Int. Cl.

| | |
|---|---|
| ***E04F 21/24*** | (2006.01) |
| ***B28B 17/00*** | (2006.01) |
| ***E04F 21/16*** | (2006.01) |

(52) U.S. Cl.

CPC .......... *E04F 21/163* (2013.01); *B28B 17/009* (2013.01); *E04F 21/245* (2013.01); *E04F 21/247* (2013.01); *E04F 21/248* (2013.01)

(58) Field of Classification Search

CPC ..... E04F 21/163; E04F 21/245; E04F 21/247; E04F 21/248; B28B 17/009

See application file for complete search history.

(56) References Cited

U.S. PATENT DOCUMENTS

| | | | | |
|---|---|---|---|---|
| 4,021,048 A * | 5/1977 | Fowler | .................. | G11B 17/02 |
| 11,643,825 B2 * | 5/2023 | Wagman, III | ......... | B28B 17/009 404/96 |
| 11,851,894 B2 * | 12/2023 | Wagman, III | ......... | B28B 17/009 |
| 11,952,787 B2 * | 4/2024 | Wagman, III | ......... | E04F 21/245 |

* cited by examiner

*Primary Examiner* — Gary S Hartmann

(74) *Attorney, Agent, or Firm* — Buchanan Ingersoll & Rooney PC

(57) ABSTRACT

Embodiments relate to a flex hub mount for a circular brush assembly. The flex hub mount includes a disc having a disc upper surface and a disc lower surface, a disc aperture, and a disc rib extending from the disc upper surface. The flex hub mount includes a flex pad having a flex pad aperture. The flex pad is dimensioned to rest on a portion of the disc upper surface between the disc aperture and the disc rib. The flex pad aperture and the disc aperture are in vertical registry. The flex hub mount includes a plug disposed within the disc aperture. The plug is configured to connect or be held adjacent to the flex pad. The plug and the flex pad are configured to close the disc aperture such that the disc aperture is sealed.

2 Claims, 12 Drawing Sheets

MOUNTING ADAPTER FOR CONCRETE SURFACE PROCESSING TOOLS

CROSS-REFERENCE TO RELATED APPLICATIONS

The present application is a continuation application of U.S. Ser. No. 18/057,087 which is a divisional application of U.S. patent application Ser. No. 16/842,994, the entire contents of each being incorporated by reference.

FIELD OF THE INVENTION

The present invention relates to surface processing machines for mounting surface processing tools and, more particularly, to a method and adapter for mounting rotatable surface processing tools on the arms of motor driven spider arm assemblies of such machines.

BACKGROUND OF THE INVENTION

It is known that during the installation of concrete floors, the troweling and finishing operation is performed on the wet concrete using either walk-behind or ride-on power trowels. Inasmuch as at least one type of power trowel machine is generally already on site during the installation of concrete floors, the present invention seeks to use the on-site availability of these machines for surface finishing purposes. As used herein, the term “surface finishing” refers to the desired surface texture on a concrete slab after troweling and final setting of the concrete. In addition, generally, concrete contractors do not have specialty surface processing machines on site for surface finishing and typically do not own such machines. Therefore, where specialty surface processing machines are used to surface finish concrete surfaces, concrete contractors have to invest in and own or lease separate, expensive pieces of equipment. As used herein, the terms “surface processing machines” and “surface processing tools” refers to machines and tools used for surface finishing a concrete slab.

In one of its forms, the present invention takes advantage of the larger finished area attainable with ride-on power trowel machines by converting these power trowel machines to surface processing machines suitable for tasks other than troweling. Ride-on power trowel machines typically range in size from approximately 6 feet to slightly more than 10 feet in width and produce a troweled area of up to 40 square feet. The largest units weigh more than a ton and can finish about 30,000 square feet per day. Ride on trowels, such as the trowel machine illustrated in FIG. 1, can be configured with two or more spider assemblies, each having a plurality of radially oriented, spaced-apart arms and a trowel blade mounted on and below each arm. The blades on adjacent rotors may be overlapping or non-overlapping. A typical four arm spider assembly suitable for use with either a ride-on or walk-behind power trowel is illustrated in FIG. 2. The assembly generally includes four radially extending arms emanating from a central hub, which receives a drive shaft. A trowel blade is mounted directly via bolts or indirectly via a mounting bar on and below each of the arms. Concrete troweling machines having spider assemblies for mounting trowel blades, and the manner of attachment of the trowel blades to the spider arms, are discussed in detail in U.S. Pat. No. 7,059,801—Snyder et al, the disclosure of which is incorporated herein by reference.

Converting walk-behind or ride-on trowel machines to general purpose surface processing machines involves providing mounting means which allows the rapid, on-site substitution of surface processing tools, such as circular brushes, on the spider arms in place of the trowel blades which were used during the installation of the concrete floor. Such mounting means have the advantage that they can mount surface processing tools, such as scrubbing, brushing, buffing and polishing tools, instead of blades, on the spider arms using readily available hand tools in a very short period of time without need for heavy or expensive equipment. Exemplary currently available mounting means which can accomplish the rapid mounting of rotatable surface processing tools on troweling machines are disclosed in U.S. Pat. No. 7,815,393—Snyder et al, the disclosure of which is incorporated herein by reference. Typically, rotatable surface finishing tools are mounted to each of the spider arms, frequently using a mounting bar, with their rotational axes in vertical registry with and directly beneath the spider arm. As the spider arms rotate about the hub, the rotatable surface processing tools, e.g., circular brushes, on each arm are intended to be free to spin about a mounting axis perpendicular to the spider arms and parallel to the axis of rotation of the spider arms.

During troweling operations on wet concrete surfaces, the surface is finished or smoothed in steps, starting with a rough finish and stepwise moving toward a so-called burnished finish. In the initial steps the spider arms and, thus, the attached trowel blades, are pivoted or pitched by the operator just a few degrees to slightly raise the leading edge of the blade off the concrete surface in order to avoid its inadvertent digging in to the concrete surface while the weight of the troweling machine maintains the trailing edge of the blade in contact with the concrete. The angle θ formed between the blade 36 and the concrete, as shown in FIG. 3, is referred to as the pitch of the blade. As surface finishing of the wet concrete progresses, the pitch of the blade is increased gradually from slightly above zero pitch to the maximum pitch of the blades, typically about θ=25°-30° in FIG. 3, on successive passes to put increasingly greater pressure on the concrete surface. The terms “leading edge” and “trailing edge” refer to the edges of the trowel blade as a function of the direction of rotation of the spider assembly, i.e., clockwise or counter-clockwise. Correspondingly, the terms “leading side” and “trailing side” refer to the sides of each of the arms 32 of the spider assembly as a function of the direction of rotation of the spider assembly, i.e., clockwise or counter-clockwise.

FIG. 4 illustrates an end view of a spider arm 32 when the spider assembly is rotating in a clockwise direction. In this and other figures the arcuate arrow indicates the direction of rotation, i.e. clockwise or counterclockwise, of the spider arm and assembly. Spider arms are typically polygonal in cross section, e.g., square, rectangular, hexagonal, octagonal, etc. FIG. 4B shows the spider arm 32 in a horizontal or unpivoted position. FIG. 4A illustrates a spider arm 32 pivoted into a leading side 32 *a* down position while FIG. 4C shows a spider arm 32 pivoted into a trailing side 32 *b* down position. Without a blade attached to each spider arm 32, but with a surface processing tool attached directly under the spider arm, the spider arms of many conventional troweling machines tend to pivot, more or less, toward a trailing side 32 *b* inclined down position as shown in FIG. 4C. If one compares the pivoted trailing side 32 *b* inclined down position of the spider arm in FIG. 4C with the unpivoted position of the spider arm in FIG. 4B it will be appreciated that the trailing side 32 *b* pivoted down position is the same as the pitched trowel blade trailing edge down position desirable during wet concrete finishing operations using trowel blades. This tendency to pivot to a trailing side down position presents a problem when trowel blades are removed from the spider arms and surface processing tools, such as brushes, grinding pads or other honing or polishing pads are installed on the spider arms. The problem is particularly noted when the surface processing tool is a rotating tool and a bearing is mounted between the spider arm and the tool in an effort to allow the tool to freely spin as the spider arm is circularly driven by the trowel assembly motor. This is because a rotating tool bearing is designed to have enough play to allow it to absorb forces encountered during use, such as a brush striking bumps on the floor or impacting with walls, and this play allows the bearing to pivot severely due to the trailing side down pivoting of the spider arm. The result is that the bearing tends to bind and is unable to freely rotate, causing it to wear more rapidly than it would in normal use. At the same time, the attached surface processing tool is unable to freely rotate, is not oriented flat on the concrete surface and is caused, by the spider arm pivoting, to wear unevenly, which shortens the tool's useful life.

SUMMARY OF THE INVENTION

Figure 1:
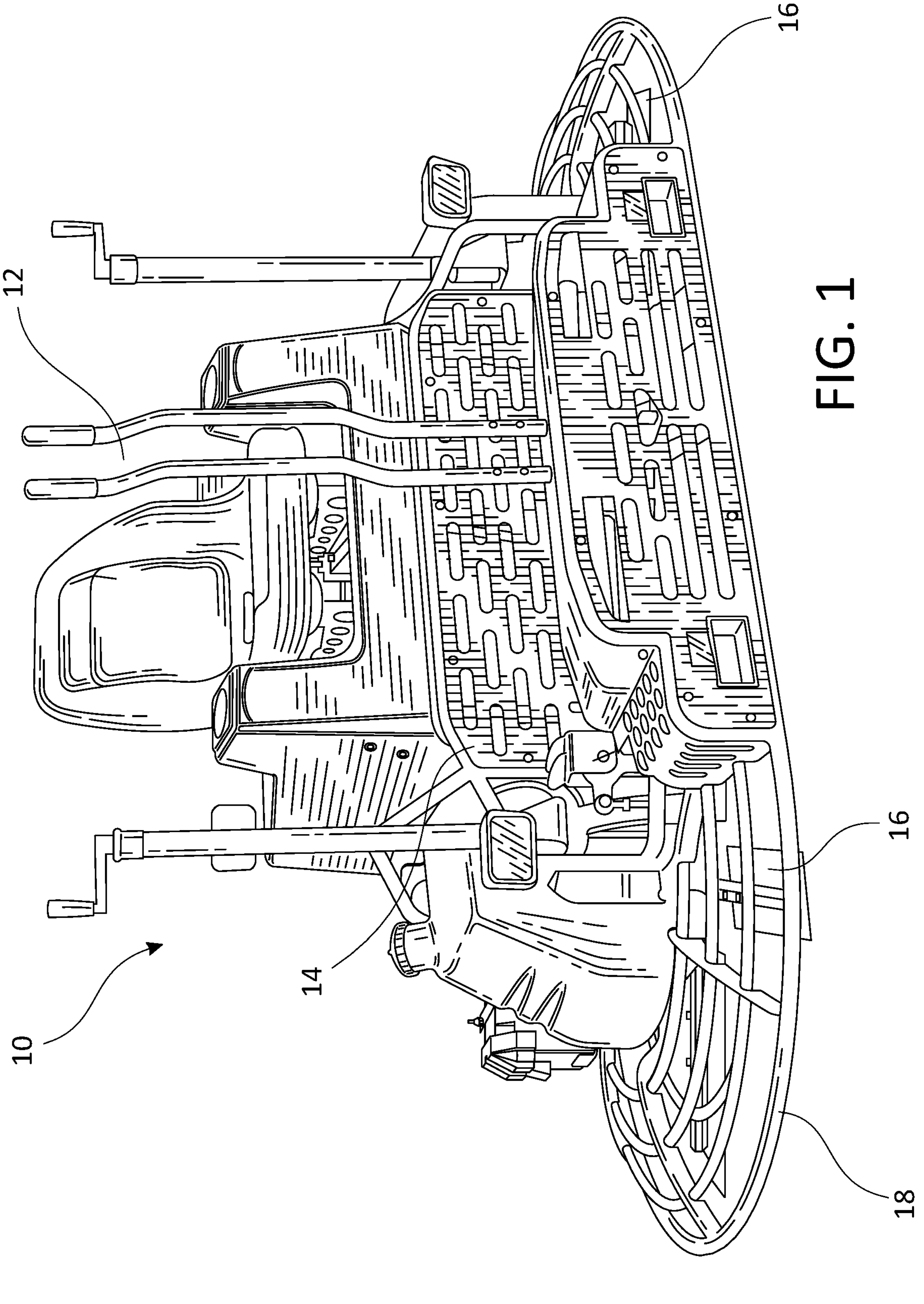
FIG. 1 is a perspective view of a ride-on power trowel.

It is, therefore, a primary object of the present invention to provide a mounting adapter for surface processing tools which allows their use on conventional power trowel machines having spider assembly arms which are typically already present at a concrete floor construction site.

It is another object of the present invention to provide a mounting adapter for mounting the rotational axis of a surface processing tool circumferentially behind the trailing side of a spider arm.

It is still another object of the present invention to provide a mounting adapter which, when mounted between a surface processing tool and a spider arm, overcomes the tendency of the spider arms to pivot toward a trailing side down position and allows the tool to function without uneven wear.

It is another object of the present invention to provide a mounting adapter which allows the rapid, on-site mounting and demounting of surface processing tools onto and from spider arms without the need for any tools whatsoever.

It is still another object of the present invention to provide a mounting adapter for rotatable surface processing tools on spider assemblies which allows such tools to spin freely about their axes while the spider arms are rotatably driven in order to encourage more uniform wear of the tools and a longer useful life.

It is yet another object of the present invention to incorporate a flex control pad in the mounting adapter which allows the bearing to pivot sufficiently to absorb forces encountered during use but to resist severe pivoting which causes the bearing to bind rather than to freely rotate while, at the same time, dampening excessive vibrations which causes the surface processing tool to damage the concrete surface.

The foregoing and other objects are achieved in accordance with the present invention by providing a mounting adapter for rotatably mounting a surface processing tool holding means to the rotatable hub of a bearing, said tool holding means having a rotational axis and comprising a tool holder body having first and second surfaces adapted to be mounted on at least one spider arm of a motor driven rotatable spider assembly of a surface processing apparatus, said spider arm having a top surface and a bottom surface, and a leading side and a trailing side as a function of the direction of rotation of said spider assembly, said mounting adapter comprising:

- bearing means supported by said second surface of said tool holder body;
- a first aperture extending centrally through said first and second surfaces;
- a rubber flex pad having a second aperture in vertical registry with and beneath said first aperture;
- means supporting said rubber flex pad along its periphery and having a third aperture in vertical registry with and beneath said second aperture;
- an end plug within said third aperture for closing the second aperture and sealing the first surface of said tool holder body against dirt and moisture, said end plug supporting said flex pad from beneath said third aperture;
- said rotatable hub of said bearing means including attachment means in the upper portion thereof for facilitating non rotatable attachment to a mounting means adapted for attachment to said spider arm.

In accordance with another aspect of the invention, the present invention provides a mounting adapter wherein said means supporting said rubber flex pad comprises a disc having said third aperture formed centrally in said disc, an upstanding circular rib spaced inwardly from the periphery of the disc and an annular floor extending inwardly from the upstanding rib and terminating at the central aperture, said rubber flex pad being supported by said annular floor while overlying said third aperture.

In accordance with still another aspect of the invention, the present invention provides a mounting adapter wherein said means supporting said rubber flex pad also serves as a guide for mounting said mounting adapter within the central aperture of said surface processing tool holder body, said means supporting said rubber flex pad further including a peripheral upstanding rib, said rib having a periphery comprising outwardly extending hubs alternating with inwardly opening cut outs.

In accordance with yet another aspect of the invention, the present invention provides a mounting adapter wherein said central aperture in said tool holder body has an internal periphery comprising inwardly extending hubs alternating with outwardly opening cut outs, said second surface of said tool holder body includes a ferromagnetic drive ring surrounding said central aperture and having the same configuration as the internal periphery of said central aperture with the hubs of the drive ring seated atop the hubs of the central aperture and the cut outs of the drive ring seated atop the cut outs of the central aperture, whereby said means supporting said rubber flex pad seats within the central aperture of said tool holder body with the hubs of its outer periphery received within the cut outs of the central aperture of said tool holder body and the cut outs of its outer periphery receiving the hubs of the central aperture of said tool holder body.

In accordance with a further aspect of the invention, the present invention provides a mounting adapter including a clamp ring having a plurality of apertures for receiving bolts and drive pins for assembling the clamp ring to the other elements of said mounting adapter, said clamp ring further including a plurality of circumferentially spaced apart pockets in its underside and magnets in said pockets, whereby when the assembled mounting adapter is inserted into said central aperture of said tool holder body, said means supporting said rubber flex pad seats within said ferromagnetic drive ring with its outwardly extending hubs received within said outwardly projecting cut outs of said central aperture of said tool holder body and with its inwardly extending cut outs receiving said inwardly extending hubs of said central aperture of said tool holder body, said magnets seating upon the inwardly projecting hubs of the ferromagnetic drive ring and magnetically attaching thereto to magnetically secure the tool holder body to the mounting adapter.

DETAILED DESCRIPTION OF THE INVENTION

Figure 2:
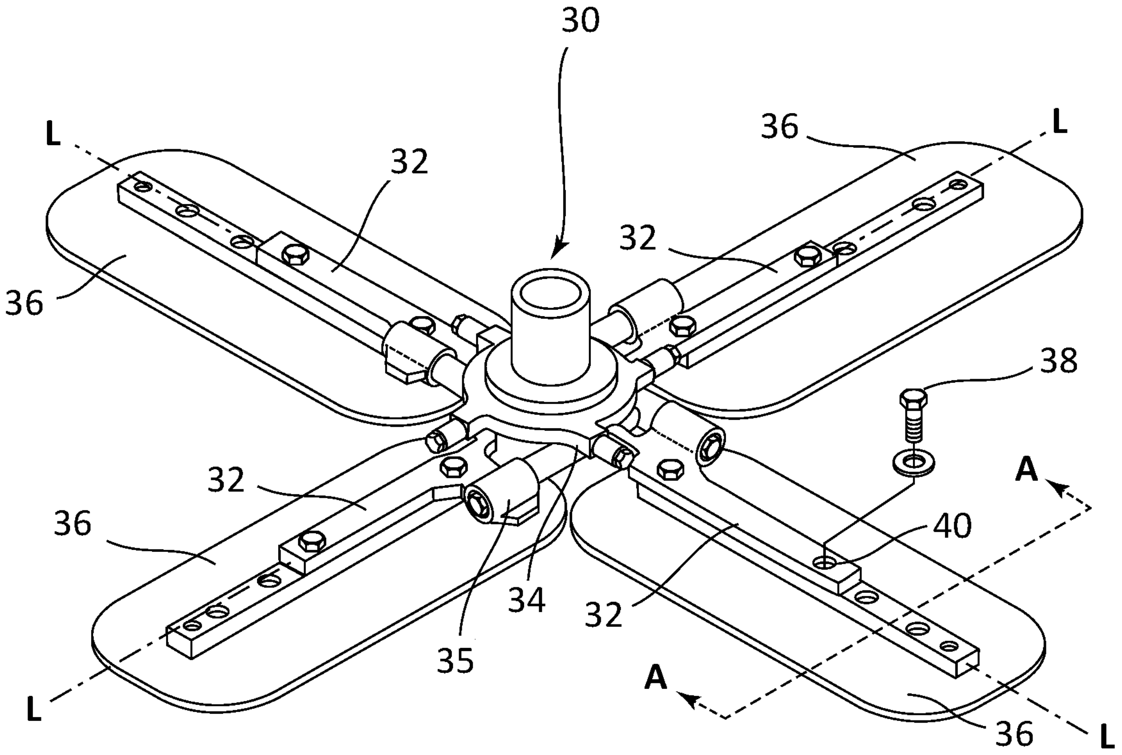
FIG. 2 is a top perspective view of a four spider arm spider assembly mounting four trowel blades and suitable for use with ride-on surface processing machines.
Figure 3:
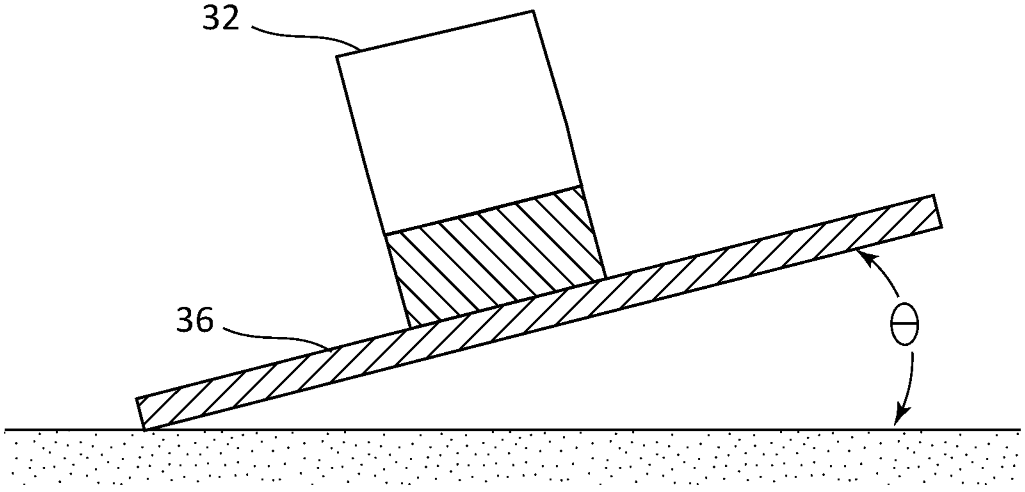
FIG. 3 is a sectional view taken along line A-A in FIG. 2 showing the pitch of a trowel blade during a finishing operation.
Figure 4A:
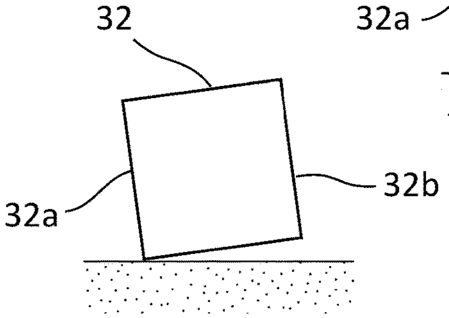
FIG. 4A is a side elevation view of the free end of a spider arm in its leading side down position.
Figure 4B:
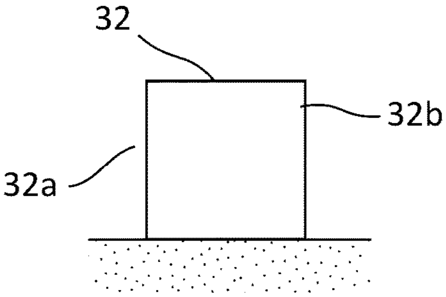
FIG. 4B shows it in its unpivoted position and FIG. 4C shows it in its trailing side down position, when the spider assembly is rotated in a clockwise direction.
Figure 4C:
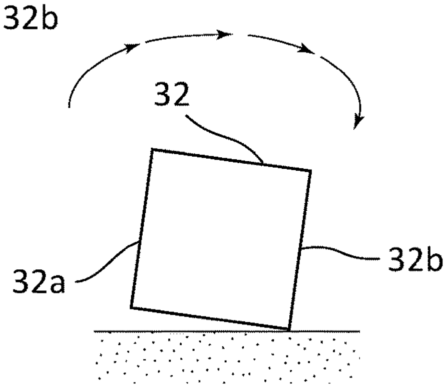

Referring to FIG. 1 there is shown a conventional ride-on concrete-finishing power trowel 10 comprising an operator seating and control station 12, an engine 14, at least two downwardly projecting spider assemblies 16, each assembly having a plurality of radially extending, circumferentially spaced-apart spider arms and a trowel blade mounted on each arm for providing at least two sets of horizontal rotating blades encircled by a guard ring cage 18. The adjacent spider assemblies 16 counter-rotate, with one rotating clockwise and the other rotating counterclockwise. A typical four arm spider assembly 30, suitable for use with either a ride-on or walk-behind power trowel, is illustrated in FIG. 2. The assembly includes four radially extending arms 32 emanating from a central hub 34, which receives a drive shaft (not shown). Each spider arm 32 includes a pivot assembly 35 which allows the arm 32 to pivot about its longitudinal axis L. A trowel blade 36 is mounted via threaded bolts 38 (and lock washers and hex nuts, if desired) below each spider arm 32 in threaded apertures 40 spaced along and extending through each spider arm 32. It will be appreciated that each rotor assembly may contain more or less than four arms for mounting trowel blades thereon, the number of arms being a matter of design choice.

The present invention provides a solution to the problem of surface processing tools wearing unevenly, to the problem of spider arm tendency to pivot which prevents free and unimpeded rotation of rotatable surface processing tools and to the problem of excessive vibration which causes the surface processing tool to chatter and damage the concrete surface. The first two of these problems are largely minimized by mounting the rotational axis of the surface processing tool circumferentially behind the trailing side of the spider arm, as is taught by U.S. Pat. No. 10,370,863—Snyder et al, the disclosure of which is incorporated herein by reference. It has been found that offsetting the surface processing tool circumferentially behind the trailing side of a spider arm helps to control s the tendency of the spider arm to pitch into a trailing side down position. It will be appreciated, of course, that the side of a spider arm which is the trailing side is a function of the direction of rotation, clockwise or counter-clockwise, of the spider assembly. It follows that the trailing side when the rotation is clockwise becomes the leading side if the rotation is counter-clockwise. Mounting the rotational axis of the surface processing tool circumferentially behind the trailing side of the spider arm is accomplished by providing a suitable offset mount 200 comprising a first means for attaching the mount to the spider arm, desirably to the top or bottom surface of the spider arm, and a second means for positioning the rotational or longitudinal axis of the surface processing tool circumferentially behind the trailing side of the spider arm. Desirably the first and second means comprising the adapter are unitary and planar but, alternatively, may be separate structures rigidly attached via well known connecting means, such as welds, bolts, and the like.

Figure 5:
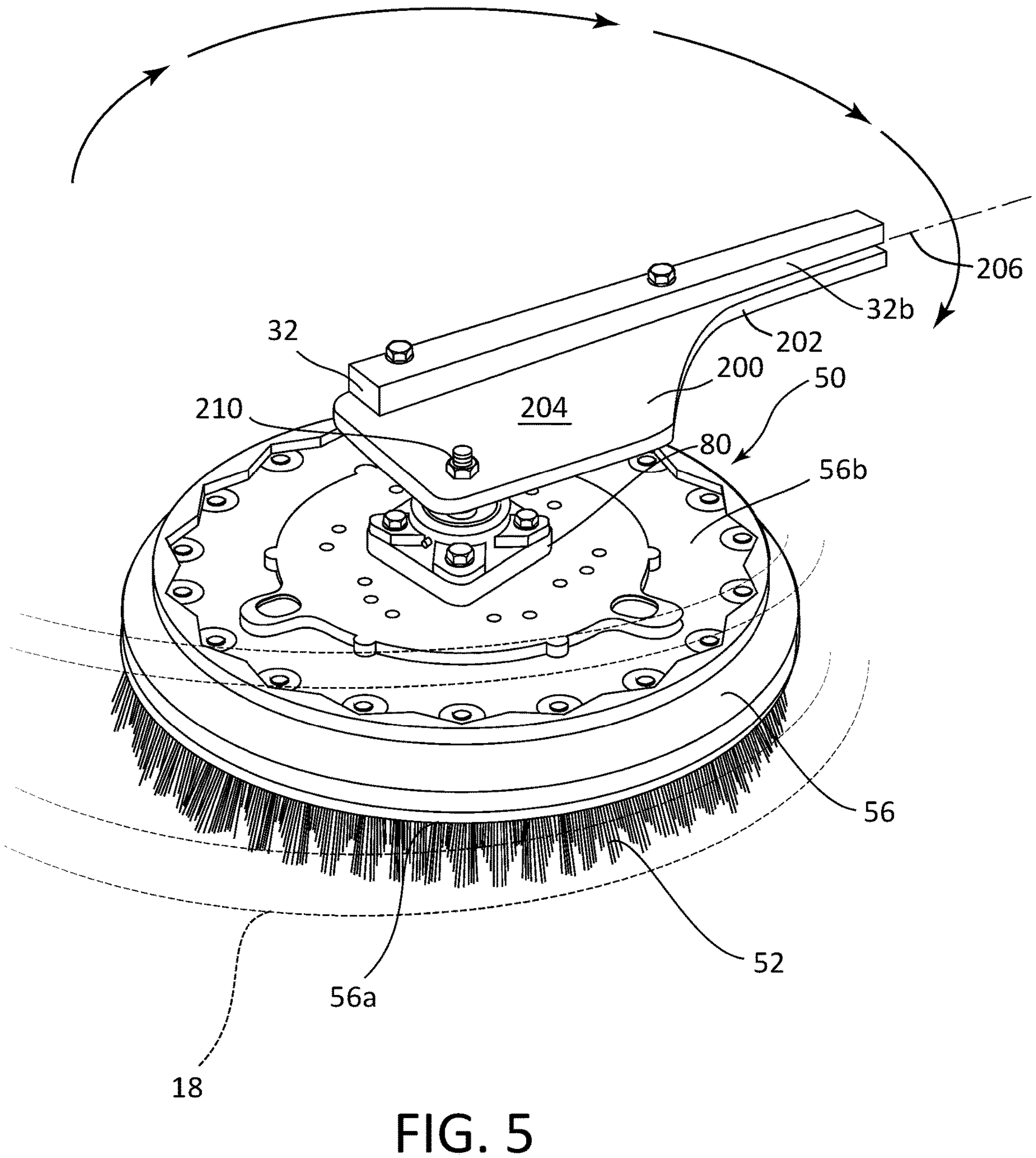
FIG. 5 is a top perspective view of a circular brush assembly mounted below a spider arm using the offset mounting plate of U.S. Pat. No. 10,370,863—Snyder et al, the disclosure of which is incorporated herein by reference.
Figure 6:
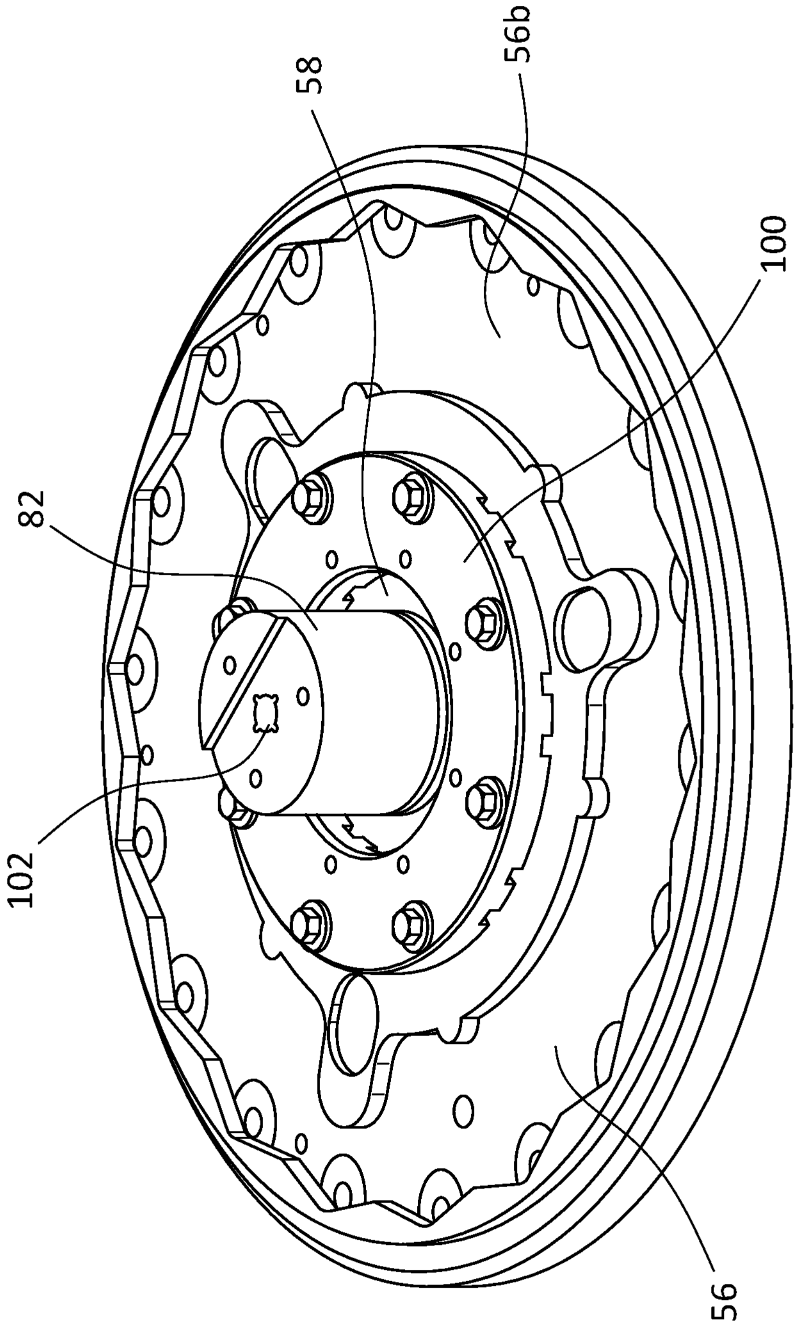
FIG. 6 is a top perspective view of one embodiment of a circular pad driver incorporating the mounting adapter of the present invention.
Figure 7:
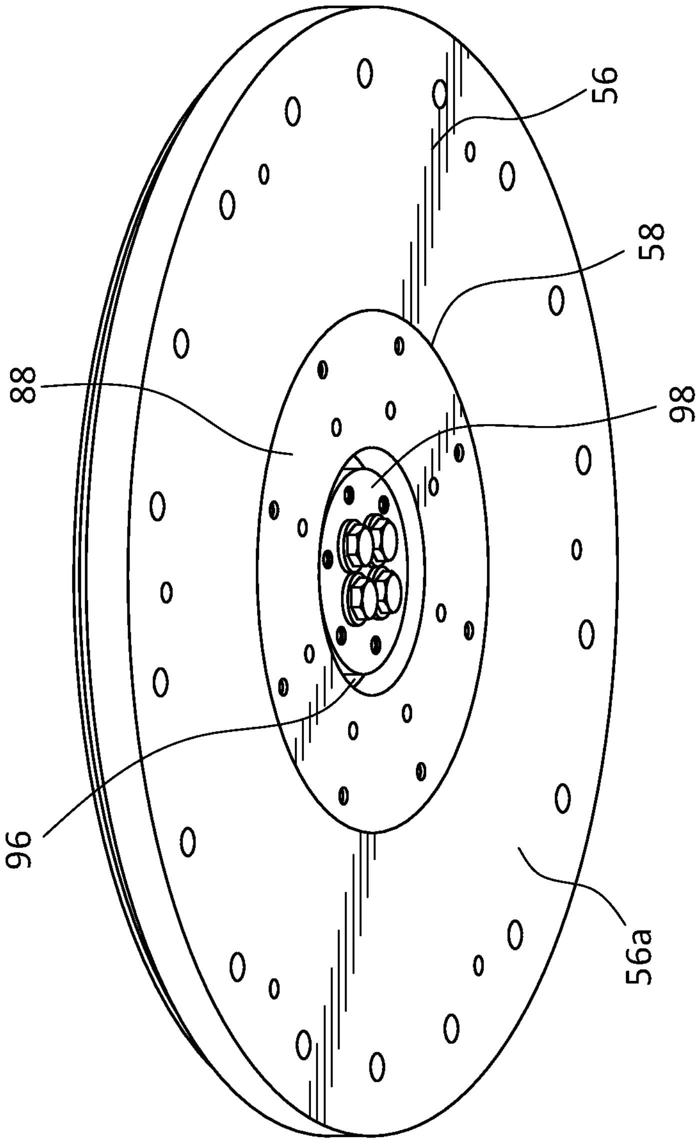
FIG. 7 is a bottom perspective view of the circular pad driver of FIG. 6.
Figure 8:
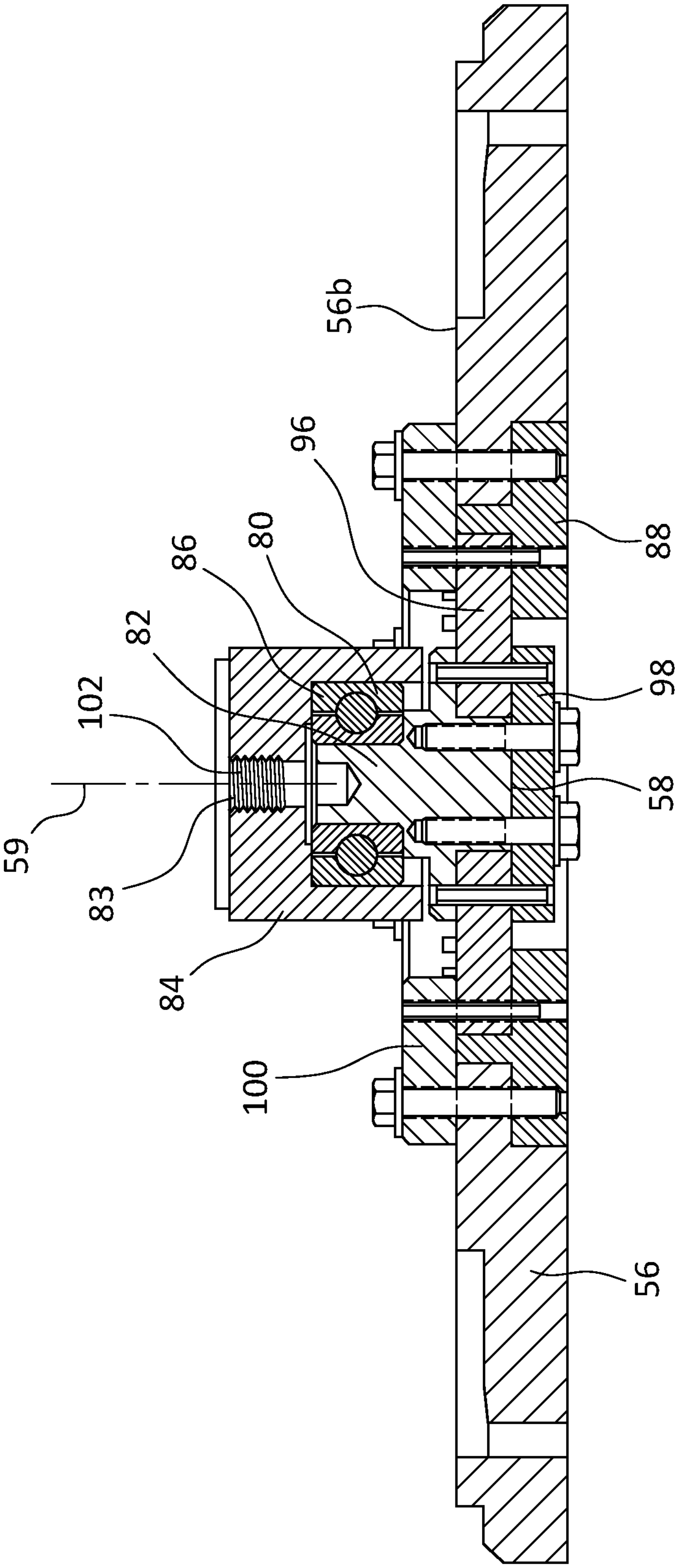
FIG. 8 is a sectional view taken along line B-B in FIG. 6.
Figure 9:
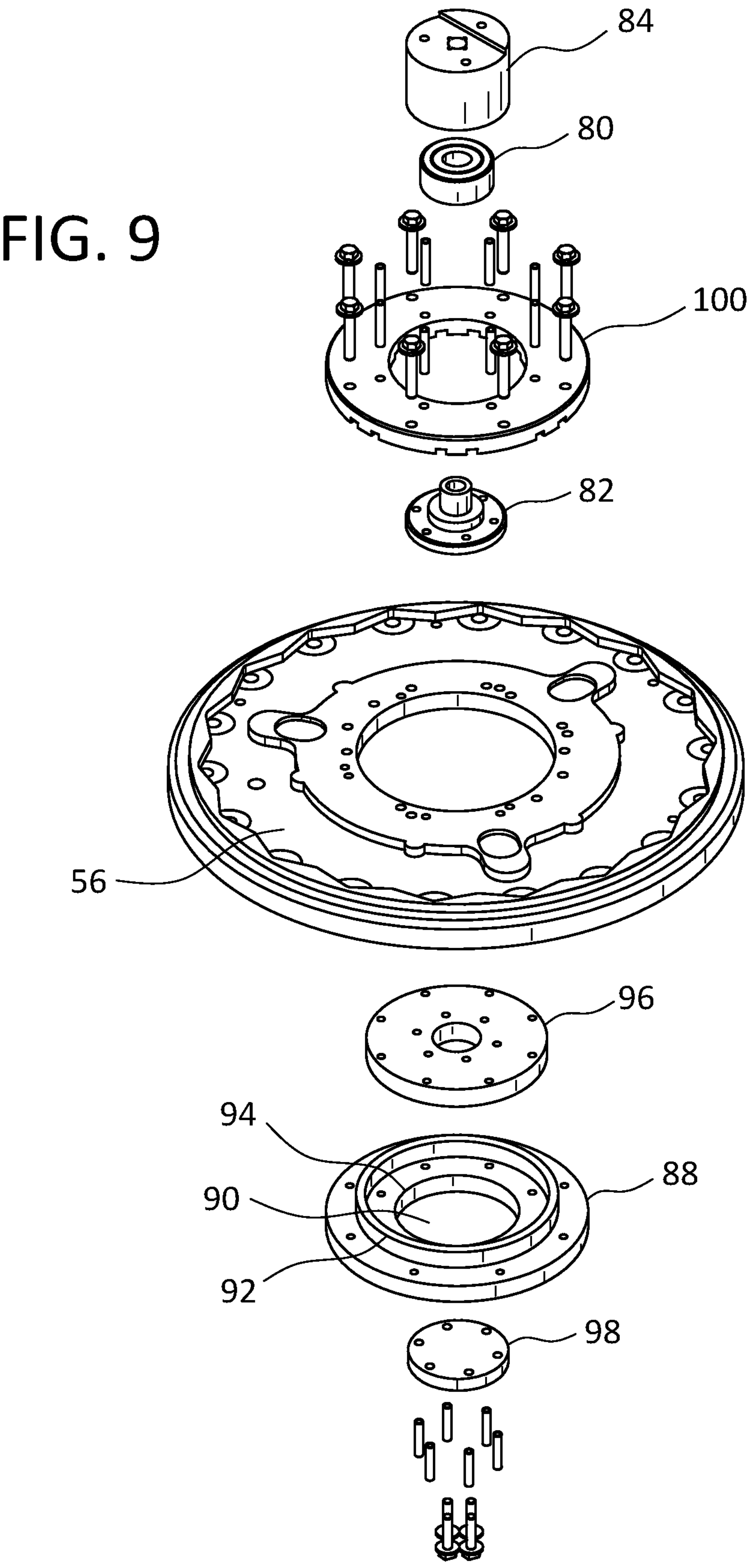
FIG. 9 is an exploded perspective view of the mounting adapter embodiment of FIG. 6.

Referring to FIG. 5, in one preferred form, each offset mounting plate 200 has the general shape of a cleaver including an elongate handle 202 which merges into a wider offset blade portion 204, which blade portion 204 extends in width in a direction generally perpendicular to the longitudinal axis 206 of the handle 202. Handle 202 includes apertures (not shown) for attachment of the handle 202 to the spider arm 32, desirably using at least two bolts, which extend through apertures in the spider arms and are received in the handle apertures, and offset blade portion 204 includes at least one aperture 210 for attachment to and positioning the surface processing tool or bearing therefor. Apertures in the offset mounting plate 200 are desirably threaded to facilitate mounting a surface processing tool or bearing thereto using a threaded bolt or the threaded end of the central shank of a typical rotary bearing 80 (and lock washers and hex nuts, if desired).

Offset mounting plate 200 is configured for easily attaching above or below spider arm 32, to provide an offset portion 204 to which a surface processing tool is mounted for positioning the rotational axis thereof circumferentially behind the trailing side 32 *b* of spider arm 32, and to not interfere with pivot assembly 35 associated with each spider arm 32. One advantage of attaching the offset mounting adapter to the top surface of the spider arm is that it reduces any tendency of a surface finishing tool to destabilize a troweling machine by raising its center of gravity. It will be appreciated that the spider assemblies of troweling machines of different manufacturers have different configurations and that the shape of the offset blade portion 204 must be adapted to not interfere with spider assembly components. For example, the length of offset blade portion 204 is shortened to not interfere with the pivot assembly of a Wacker Neuson spider assembly. However, for use with troweling machines of other manufacturers, which may have different spider assembly configurations, the offset blade portion 204 might extend the entire length of the handle 202 or might be otherwise configured to accommodate the spider assembly configuration.

It will also be appreciated that although the mounting adapter of the present invention will be described herein with reference to ride-on surface processing machines due to the unique advantage they offer in terms of square feet of concrete which can be finished per day, the mounting adapter can, of course, be used with walk-behind surface processing machines which also conventionally use downwardly projecting rotor or spider assemblies for mounting trowel blades. In addition, although the present invention will be described herein primarily with reference to pad drivers and circular brushes as illustrative of rotatable surface processing tools, it will be appreciated that the mounting adapter of the present invention can, of course, be used with other rotatable surface processing tools, such as scrubbers, buffers, abrasive pads, polishers, and the like.

FIG. 5 illustrates the manner in which offset mounting plate 200 mounts onto a typical rotary bearing 80 of a circular brush using a lock washer and hex nut, or equivalent connectors. When the configuration of FIG. 5 is mounted to a spider arm via apertures in the plate 200, the bearing (and, therefore, the surface processing tool to which the bearing is affixed) is no longer positioned with its rotational axis in vertical registry with and directly beneath the spider arm. Rather, it is positioned with its rotational axis circumferentially offset from and behind the trailing side of the spider arm 32.

Still referring to FIG. 5 there is shown a typical circular brush assembly 50 including a circular bristle brush 52 in the form of a ring having a hollow center (not shown) mounted to or with the bristles extending from the underside 56 *a* of a brush cover plate 56, which has an upper surface 56 *b* which may be flat or slightly convex. Cover plate 56 includes a central aperture (not shown) for receiving a typical rotary bearing 80 therethrough. A brush assembly 50 is mounted to one of the arms 32 of a spider assembly 30 by first mounting the brush assembly to aperture 210 of an offset mounting plate 200, which itself is mounted below, as shown, or above (not shown) arm 32 of the spider assembly 30. Brush assembly 50 is thereby mounted with its rotational axis offset to the rear of the trailing side 32 *b* of the spider arm 32, which can be clearly seen in FIG. 5 as spider arm 32 rotates clockwise. Brush assembly 50 is mounted to offset mounting plate 200 in a manner which allows brush assembly 50 to lie flat on the concrete surface and to spin freely on its axis, as will be seen from the following description. Alternatively, circular bristle brush 52 may depend from the underside of a separate bristle mounting plate (not shown) which is affixed to the underside 56 *a* of brush cover plate 56.

Referring to FIGS. 6-9, initially a rotary bearing 80 is mounted, e.g., via bolts, on the upper surface 56 *b* of pad driver cover plate 56 and positioned thereon such that bearing 80 is concentric with the central aperture 58 of the pad driver cover plate 56. Bearing 80 may be any type of bearing, e.g., ball bearing, roller bearing, fluid bearing, magnetic bearing, etc., which will permit each of the pad drivers 56 on each spider arm 32 to spin freely about its mounting axis perpendicular to the arms. In one illustrative embodiment, bearing 80 includes a stationary bearing hub 82 having a central bore 83, which is mounted to the pad driver cover plate upper surface 56 *b*, a rotating mounting hub 84, including an extension of central bore 83, which is threaded at its upper end 102, to facilitate mounting to an offset adapter such as the offset adapter disclosed in U.S. Pat. No. 10,370,863—Snyder et al. Rotating mounting hub 84 surrounds stationary hub 82 and bearing means 86 sealed within bearing 80 to facilitate concentric relative rotation of the hubs about a common axis, which is the central axis 59 of the pad driver central aperture 58. With bearing 80 bolted in place on the upper surface 56 *b*, flex hub mount 88 is inserted into the central aperture 58 of pad driver cover plate 56 from the underside of pad driver cover plate 56. Flex hub mount 88 is a circular disc having a central aperture 90, an upstanding circular rib 92 spaced inwardly from the periphery of the flex hub mount 88 and an annular floor 94 extending inwardly from the upstanding rib 92 and terminating at the central aperture. A rubber flex pad 96 having a central aperture seats on the annular floor 94 of flex hub mount 88 and end plug 98 closes the central opening 90 of flex hub mount 88 from its underside to seal the bottom end of the adapter against dirt and moisture The flex pad 96, in a preferred embodiment, is formed of a composite hard neoprene rubber which is flexible to absorb the bumps and vibrations of the polishing process and stiff enough to allow only limited swivel movement of bearing 80. It will be appreciated that the flex pad 96 can be modified from the preferred form to add more or less flexibility or stiffness to the performance of the overall flex hub, e.g. by modifying the type and stiffness of material used for the flex pad and/or by altering the support therefor. Inasmuch as the diameter of end plug 98 is smaller than the diameter of the central aperture 90 in flex hub mount 88 an annular portion of the rubber flex pad 96 is accessible through the underside central opening in pad driver cover plate 56. End plug 98 is secured in place with bolts extending through the end plug 98 and threaded into bearing hub 82 and by drive pins extending through flex hub mount 88, rubber flex pad 96 and into bearing hub 82. An annular clamp ring 100 seats on the cover plate upper surface 56 *b* and is secured in place by a plurality of bolts extending through the clamp plate 100, through the pad driver cover plate 56 and threaded into the flex hub mount 88 as well as by a plurality of drive pins extending upwardly through the end plug 98, and the flex hub mount 88, through the rubber flex pad 96 and secured in the clamp ring 100 and the bearing hub 82. It will be appreciated how the movement of the mounting hub 84 and the bearing hub 82 are constrained by the rubber flex pad 96. A recessed aperture 83 is preferably internally threaded at upper end 102 of mounting hub 84 to facilitate inserting a threaded bolt for attaching the mounting adapter to offset mounting plate 200.

Figure 10:
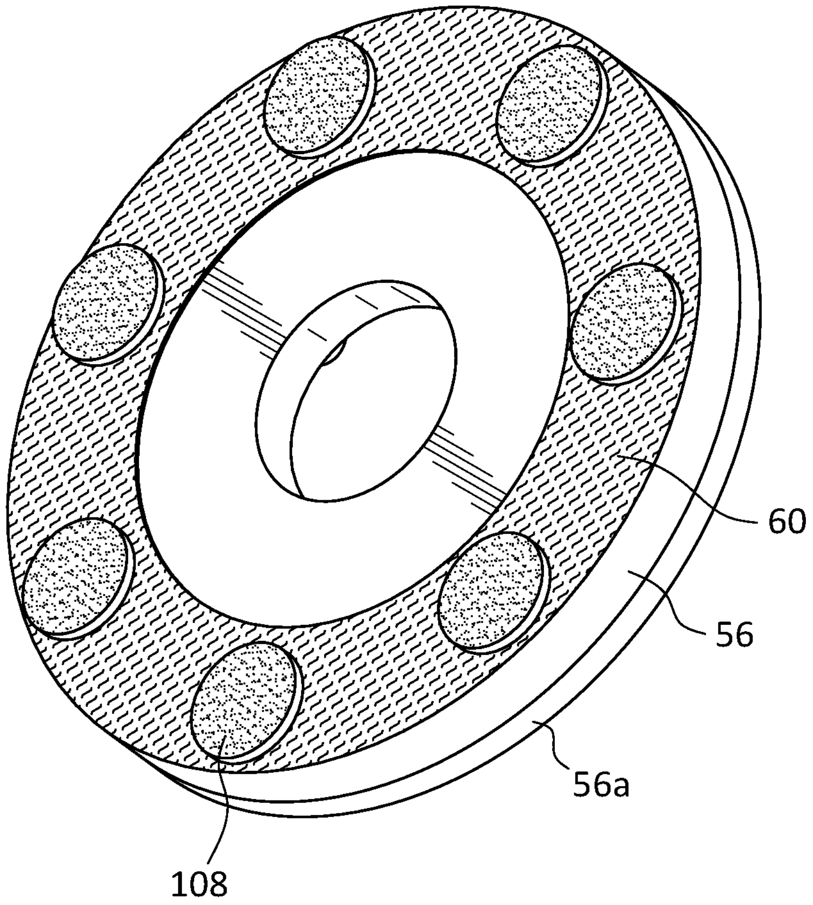
FIG. 10 is a bottom perspective view of a pad driver showing circularly spaced apart abrasive pads mounted along the bottom of the pad driver.
Figure 11:
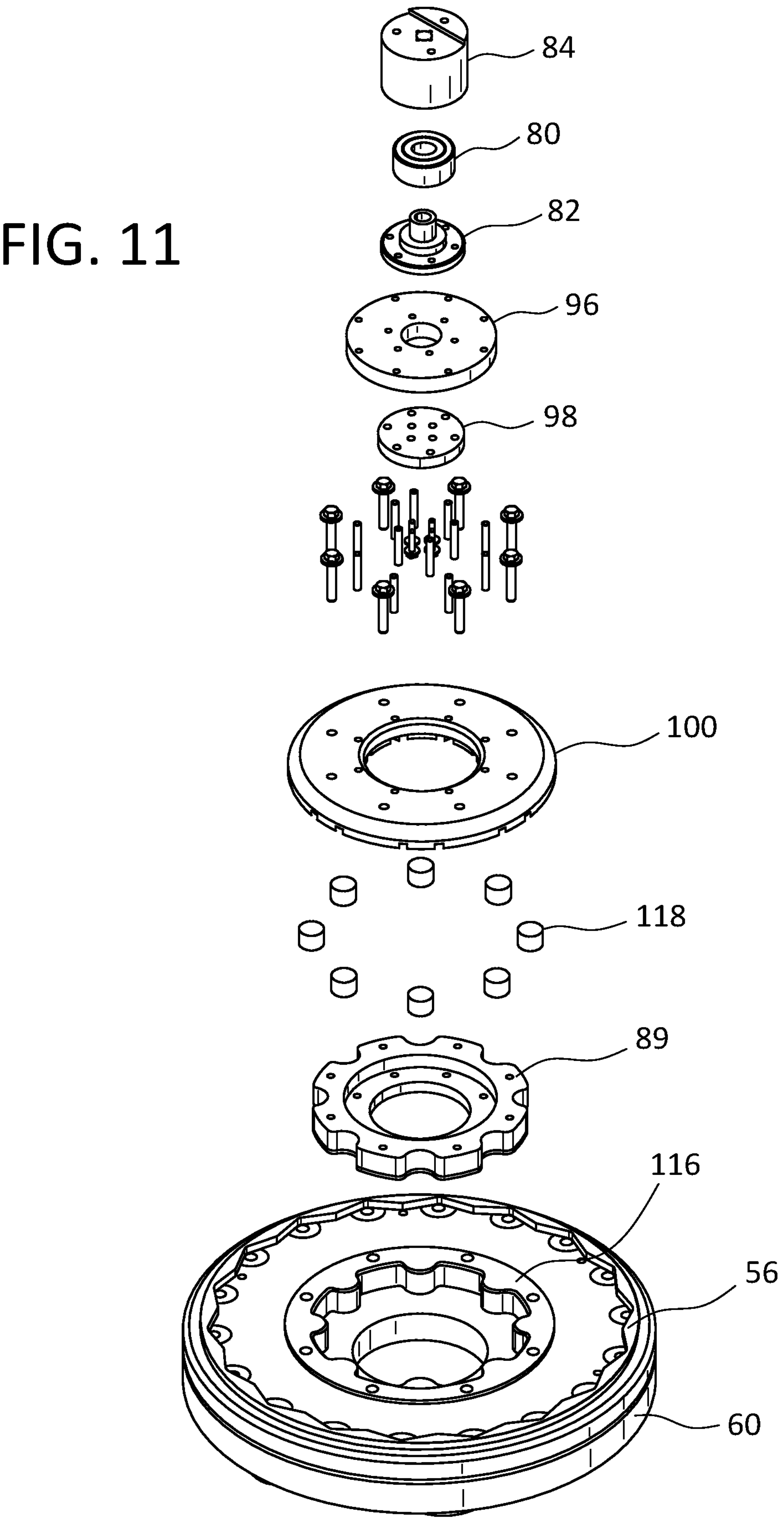
FIG. 11 is an exploded perspective view of a second embodiment of the mounting adapter of the present invention.

For mounting abrasive pads 108 in a circumferential spaced apart pattern on the underside 56 *a* of cover plate 56 (see FIG. 10), hook and loop fasteners 60 are provided as a layer or coating on the underside 56 *a* of cover plate 56 for mating with hook and loop fasteners (not shown) on the undersides of the abrasive pads 108. Hook and loop fasteners are commercially available under the trademark VELCRO®. Likewise, a circular bristle brush 52 depending from the underside of a flat bristle mounting plate 53 can be mounted to cover plate 56 (see FIG. 12) by providing a layer or coating of hook and loop fasteners (not shown) on each of the underside 56 *a* of cover plate 56 and the upper surface of the flat bristle mounting plate for mating the bristle mounting plate to the underside 56 *a* of cover plate 56.

Mounting the surface processing tool to the offset mounting plate 200 instead of directly to the spider arm 32 positions the rotational axis of the tool behind the trailing side 32 *b* of the spider arm 32 instead of in vertical registry with the longitudinal axis L of the spider arm 32 and overcomes the trailing side 32 *b* down tendency of the spider arms 32. This allows the bearing 80 of rotational surface processing tools to operate normally and to freely rotate and causes the surface processing tools to operate while oriented flat on the concrete surface. See FIG. 5. As a result, the surface-finishing tools wear uniformly rather than unevenly and undesirable swirls and marks on the concrete surface are avoided.

Figure 12:
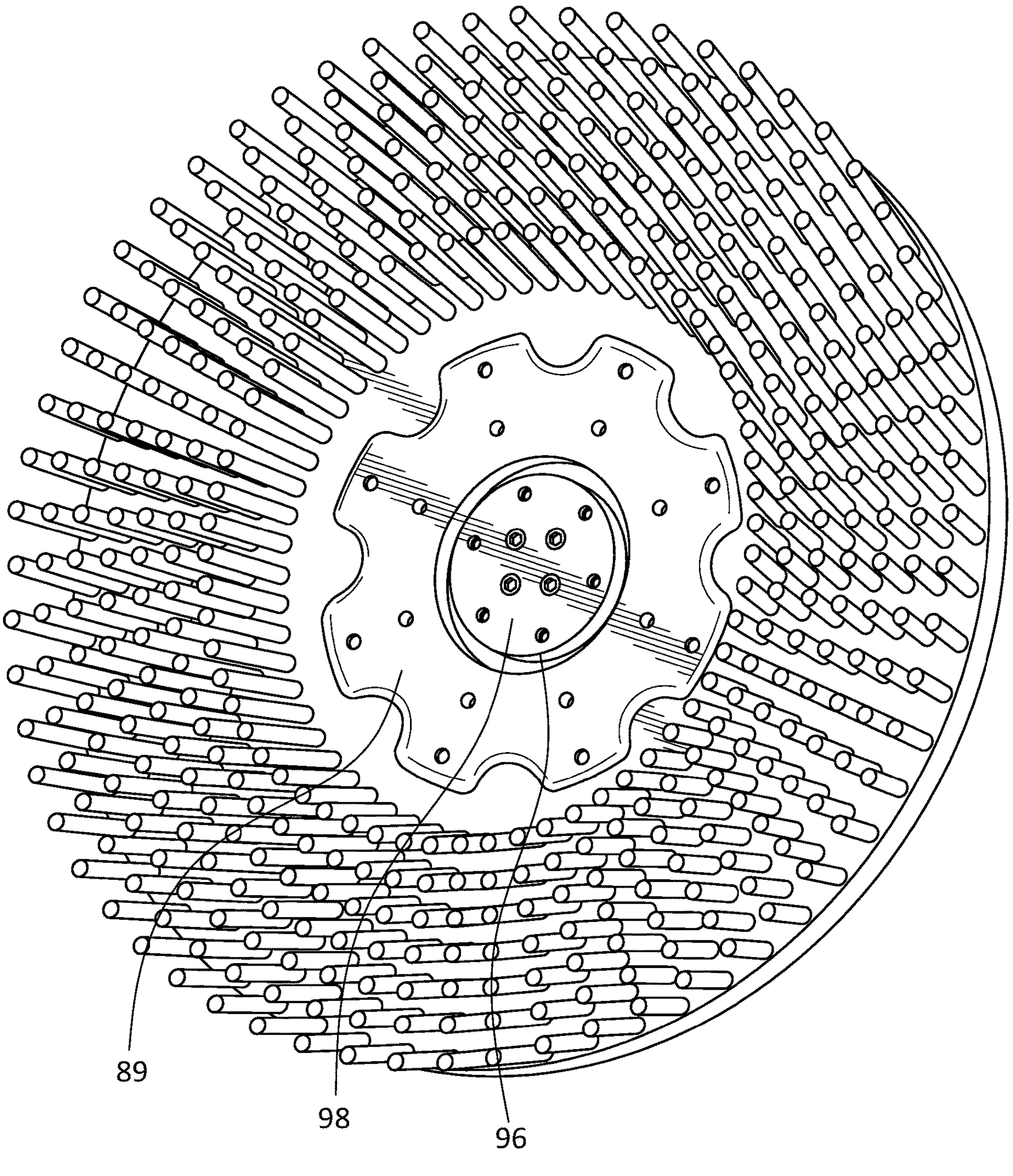
FIG. 12 is a bottom perspective view of a circular bristle brush surface processing tool incorporating the second embodiment of the mounting adapter of the present invention.
Figure 13:
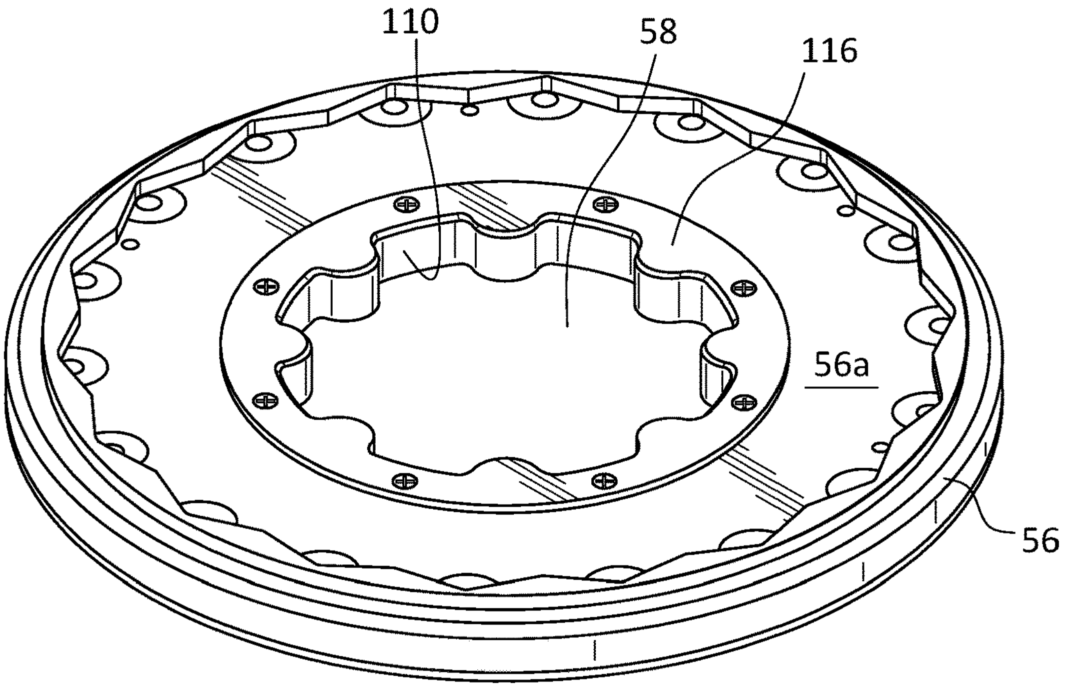
FIG. 13 is a top perspective view of a pad driver adapted for use with the second embodiment of the mounting adapter of the present invention.
Figure 14:
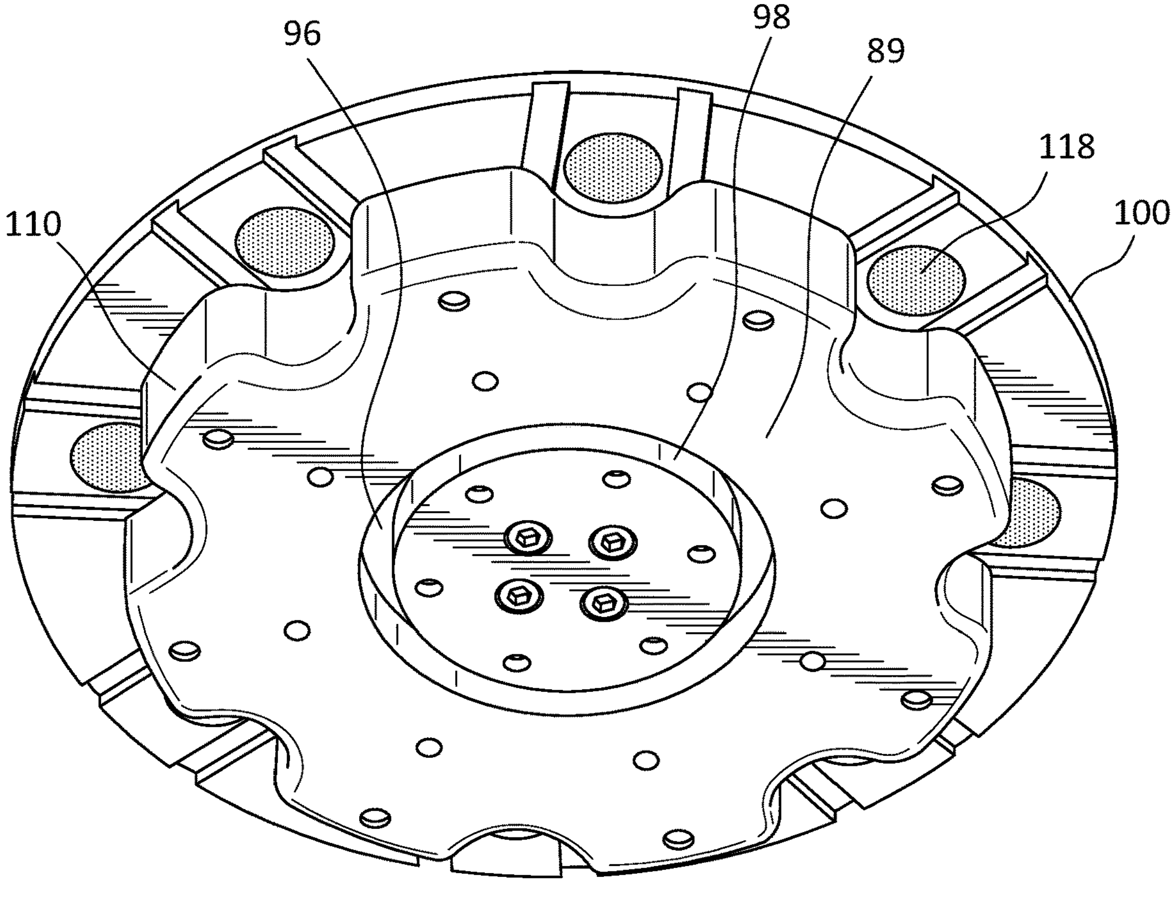
FIG. 14 is a bottom perspective view of the clamping plate, magnets and guide of the second embodiment of the mounting adapter of the present invention.

Referring to FIGS. 11-14 there is shown a second embodiment of the mounting adapter of the present invention. In this embodiment, the flex hub mount is designated by the numeral 89 and serves also as a guide for facilitating the mounting of the mounting adapter of the present invention in the central aperture 58 of pad driver 56 and as such is designated flex hub mount/guide 89. The central aperture 58 has an inner peripheral shape which is complementary to the shape of the outer periphery 110 of the flex hub mount/guide 89 of this second embodiment, both of which define a circular male and female configuration adapted for the male to seat within the female with each consisting of alternating hubs and cut outs. Referring to FIG. 13 it also has a drive ring 116, formed of steel or other ferromagnetic metal, having the same configuration as the internal periphery of the central aperture 58. The ferromagnetic drive ring 116 surrounds the upper surface of the central aperture configuration with the hubs of the drive ring seated atop the hubs of the central aperture and the cut outs of the drive ring 116 seated atop the cut outs of the central aperture 58, which allows the flex hub mount/guide 89 to seat within the central aperture 58 with the hubs of its outer periphery 110 seated within the cut outs of the central aperture 58 and the cut outs of the outer periphery 110 receiving the hubs of the central aperture 58. Central aperture 58 also includes a depressed shoulder to limit its depth and to provide an annular shelf 111 on which flex hub mount/guide 89 seats while engaging the hubs and cut outs within central aperture 58. Flex hub mount/guide 89 is a circular disc having a central aperture 90, an upstanding peripheral rib 93 and an annular floor 94 extending inwardly from the upstanding rib 92 and terminating at the central aperture 90. A rubber flex pad 96 having a central aperture seats on the annular floor 94 of flex hub mount/guide 89 and end plug 98 closes the central opening 90 of flex hub mount 88 from its underside to seal the bottom end of the mounting adapter against dirt and moisture. The rubber flex pad 96 of this second embodiment is the same rubber flex pad described herein in connection with the first embodiment. Inasmuch as the diameter of end plug 98 is smaller than the diameter of the central aperture 90 in flex hub mount/guide 89 an annular portion of the rubber flex pad 96 is accessible through the underside central opening in pad driver cover plate 56. See FIGS. 12 and 14. End plug 98 is secured in place with bolts extending through the end plug 98 and threaded into bearing hub 82 and by drive pins extending through flex hub mount 88, rubber flex pad 96 and into bearing hub 82. It will be appreciated how the movement of the mounting hub 84 and the bearing hub 82 are constrained by the rubber flex pad 96. Referring to FIG. 12, the underside of a bristle brush surface processing tool is shown together with an underside view of the flex hub mount/guide 89 and end plug 98. An annular clamp ring 100 has a plurality of circumferentially spaced apart pockets along its underside for receiving magnets 118. Flex hub mount/guide 89 is affixed to the underside of, and of smaller diameter than, clamp ring 100. See FIG. 14. As a result. when the assembled mounting adapter of the present invention is inserted into central aperture 58 of pad driver 56, flex hub mount/guide 89 seats within ferromagnetic drive ring 116 with its outwardly extending hubs seated within the outwardly projecting cut outs of the ferromagnetic drive ring 116 and of the central aperture 58 of the tool holder and with its inwardly extending cut outs receiving the inwardly extending hubs of the ferromagnetic drive ring 116 and of the central aperture 58 of the tool holder. The flex hub mount/guide 89 is secured in place by a plurality of bolts extending through the clamp plate 100, through the ferromagnetic drive ring 116 mounted atop the pad driver cover plate 56 and threaded into the flex hub mount/guide 89 as well as by a plurality of drive pins extending upwardly through the end plug 98 and the flex hub mount/guide 89, through the rubber flex pad 96 and secured in the clamp ring 100 and the bearing hub 86. Flex hub mount/guide 89 seats deeply enough within central aperture 58 that the magnets 118 seat upon the inwardly projecting hubs of the ferromagnetic drive ring 116 and magnetically attach thereto to magnetically secure pad driver 56 to the mounting adapter of the present invention.

While the present invention has been described in terms of specific embodiments thereof, it will be understood that no limitations are intended to the details of construction or design other than as defined in the appended claims.

What is claimed is:

1. A flex hub mount for a circular brush assembly, the flex hub mount comprising:

a disc having a disc upper surface and a disc lower surface, a disc aperture, and a disc rib extending from the disc upper surface;

a flex pad having a flex pad aperture, the flex pad dimensioned to rest on a portion of the disc upper surface between the disc aperture and the disc rib;

wherein the flex pad aperture and the disc aperture are in vertical registry; and a plug disposed within the disc aperture and configured to connect or be held adjacent to the flex pad, wherein the plug and flex pad are configured to close the disc aperture such that the disc aperture is sealed.

2. The flex hub mount of claim 1, where in the disc rib is space inwardly from an outer periphery of the disc.

* * * * *